March 16, 1954  D. V. HOTSON  2,672,585
POWER FACTOR REGULATOR WITH UNDERVOLTAGE PROTECTION
Filed Nov. 13, 1951

Inventor
Dale V. Hotson
by Walter S. Mallen Jr.
Attorney

Patented Mar. 16, 1954

2,672,585

UNITED STATES PATENT OFFICE 2,672,585

POWER FACTOR REGULATOR WITH UNDER-VOLTAGE PROTECTION

Dale V. Hotson, Milwaukee, Wis., assignor to Allis-Chalmers Manufacturing Company, Milwaukee, Wis.

Application October 13, 1951, Serial No. 251,237

5 Claims. (Cl. 322—20)

This invention relates in general to electric regulating systems and in particular to means for controlling an electric circuit to limit the magnitude of an operating condition thereof.

Control systems are known in which a regulator which is normally operative to maintain constant an operating condition of an electric circuit, such as voltage, current, speed or power factor, is overcome by the action of means responsive to another operating condition of the circuit attaining a limiting value. When synchronous dynamoelectric machines are connected to an electric circuit and the operating condition being regulated is the power factor of the circuit, it is desirable to provide some means responsive to the voltage of the circuit for overcoming the power factor regulator when the circuit voltage decreases to a predetermined critical value to prevent the power factor regulator from decreasing the machine excitation below the synchronous stability limit. Heretofore, some systems utilized a relay operative upon the circuit voltage attaining a critical value below the normal voltage for recalibrating the power factor regulator to prevent the regulator from decreasing the excitation of the machine below the stability limit. However, the operation of this system is slow owing to the presence of the mechanical elements, is subject to faulty operation and requires maintenance of the mechanical elements.

These disadvantages may be overcome by utilizing means having no moving parts and which is operative upon a predetermined undervoltage condition of the circuit to prevent the machine excitation from decreasing below a predetermined value independently of the operation of the power factor regulator.

It is therefore an object of this invention to provide a new and improved electric regulating system.

It is an additional object of this invention to provide an improved system for an electric circuit provided with regulating means for maintaining one operating condition of the circuit constant, in which system the operation of the regulating means is abruptly overcome in response to another operating condition of the circuit attaining a limiting value.

It is a further object of the present invention to provide undervoltage responsive means for a power factor regulator having no moving parts.

Figure 1:
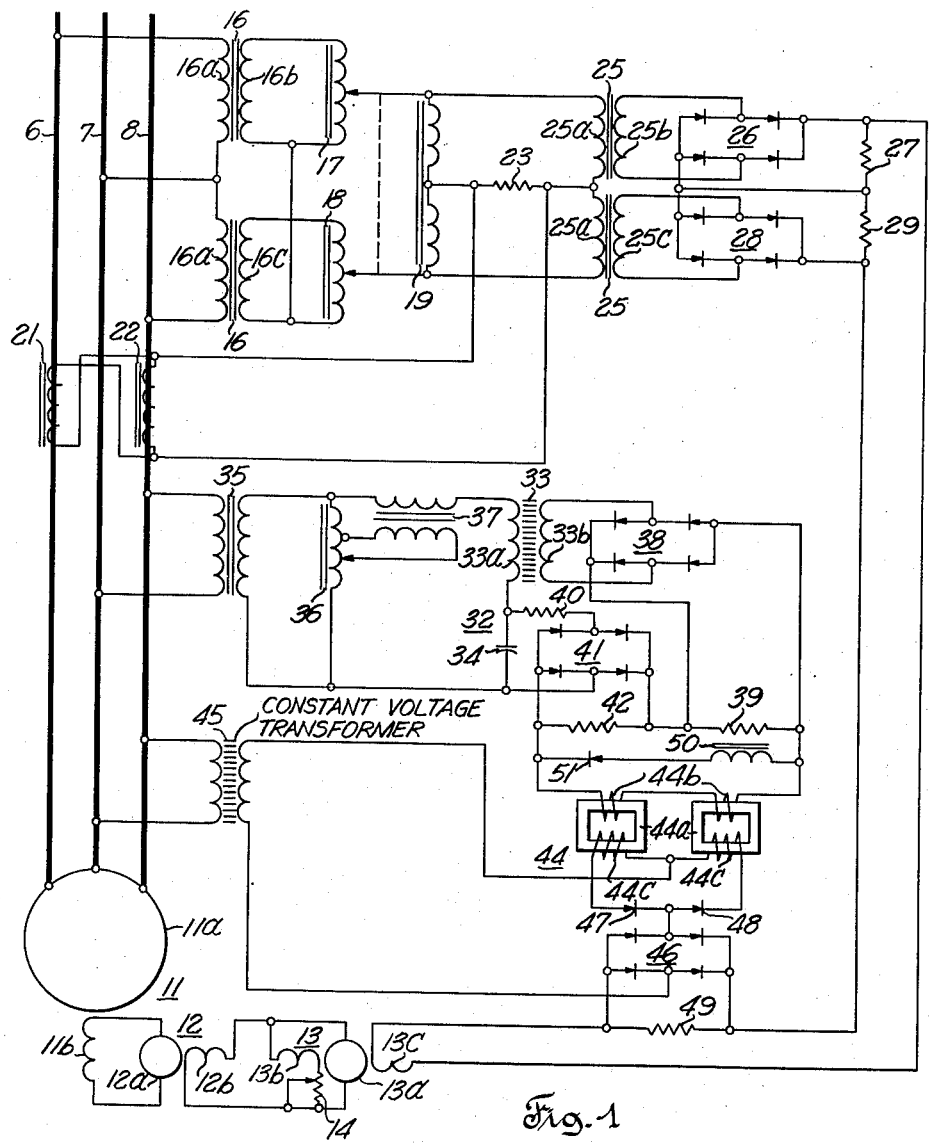
Figure 2:
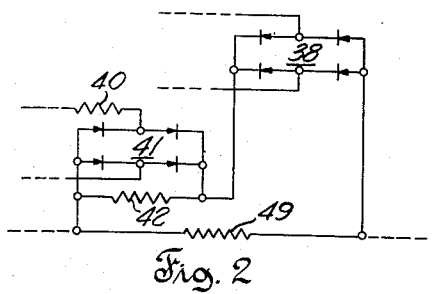

Objects and advantages other than those set forth above will be apparent from the following description when read in connection with the accompanying drawing, in which:

Fig. 1 diagrammatically illustrates the circuits and apparatus of one embodiment of the invention, and Fig. 2 partially illustrates the circuits and apparatus of an alternate embodiment of the invention.

Referring to Fig. 1, one embodiment of the invention is illustrated in connection with the control of an alternating current circuit represented by conductors 6, 7, 8 to which is connected the armature 11a of a synchronous dynamoelectric machine 11 having a field winding 11b. Field winding 11b is supplied with excitation current from any suitable source such as the armature 12a of a main exciter generator 12 having a field winding 12b. Field winding 12b is in turn supplied with current from the armature 13a of an amplifying exciter generator 13 having field windings 13b, 13c. Field winding 13b is connected across armature 13a in series with an adjustable resistor 14 to provide a variable amount of the excitation for generator 13. Control field winding 13c is connected to be energized by a measure of the conditions being regulated.

If it is desired to maintain a constant power factor in conductors 6, 7, 8, suitable means are provided to supply to field winding 13c a control voltage dependent upon this power factor. Such means may include potential transformers 16 having primary windings 16a connected to conductors 6, 7, 8 as shown and having a pair of secondary windings 16b, 16c connected to autotransformers 17, 18, respectively. The voltage between the adjustable taps of transformers 17, 18 is impressed across an additional autotransformer 19 to produce thereacross a voltage which is a measure of the voltage of conductors 6, 7, 8. A pair of current transformers 21, 22 are connected in circuit with conductors 6, 8, respectively, to produce across a resistor 23 a voltage which is a measure of the current in conductors 6, 7, 8. Resistor 23 is connected between the center terminal of transformer 19 and the center terminal of the primary windings 25a of isolating transformers 25.

Secondary winding 25b of transformer 25 is connected to the alternating current terminals of a full wave rectifier 26 having its direct current terminals connected to a resistor 27. Secondary winding 25c is similarly connected to a full wave rectifier 28 having a resistor 29 connected across the direct current terminals thereof. Resistors 27, 29 have a common terminal, and the connections of rectifiers 26, 28 are such that the voltage appearing across the noncommon terminals of resistors 27, 29 is proportional to the difference between the average values of the voltages of windings 25b, 25c.

The connections of transformers 16, 17, 18, 21 and 22 are such that the voltage across resistor 23 is in quadrature with the voltage across the outer terminals of transformer 19 when machine 11 is operating at the desired power factor. This results in equal voltages being produced across secondary windings 25b, 25c so that under these conditions the voltage across the noncommon terminals of resistors 27, 29 is zero.

This invention provides means responsive to the voltage of conductors 6, 7, 8 in the form of a nonlinear resonant network 32. Network 32 may be energized by a measure of the voltage of conductors 6, 7, 8 through a potential transformer 35 and through a booster transformer 37 energized from an autotransformer 36. Network 32 comprises a magnetically saturable device of any suitable type having a winding connected in series with a capacitor. Such device may consist of a saturable transformer 33 having a primary winding 33a connected in series with a capacitor 34.

Transformer 33 has a secondary winding 33b, the voltage of which is proportional to the voltage of winding 33a, connected to the alternating current terminals of a full wave rectifier 38 having its direct current terminals connected to a resistor 39. Capacitor 34 is connected through a resistor 40 to the alternating current terminals of a rectifier 41 having a resistor 42 connected across the direct current terminals thereof. Resistors 39, 42 are provided with a common terminal, and owing to the connections of rectifiers 38, 41, the control voltage appearing across the noncommon terminals of resistors 39, 42 is proportional to the difference between the average values of the voltage of winding 33a and the voltage of capacitor 34. A reactor 50 and a rectifier 51 may be serially connected across the noncommon terminals of resistors 39, 42 to limit the voltage of a predetermined polarity appearing across these noncommon terminals.

This control voltage is impressed on the control winding 44b of a polarity sensing device of any suitable type such as a self-saturated magnetic amplifier 44 having a pair of saturable cores 44a and a reactance winding 44c. Reactance winding 44c is supplied with current from a suitable source of substantially constant voltage such as a transformer 45 connected to conductors 7, 8 and is connected to the alternating current terminals of a full wave rectifier 46 through a pair of half wave rectifiers 47, 48. A resistor 49 is connected to the direct current terminals of rectifier 46 to have impressed thereacross an output voltage dependent upon the saturation of amplifier 44. Resistor 49 is connected in circuit with resistors 27, 29 in the circuit of field winding 13c to control the excitation of machine 11 in response to variations in the above mentioned output and control voltages.

In operation, assuming that the voltage of conductors 6, 7, 8 is normal, and that resistor 14 is adjusted so that field winding 13b supplies all of the excitation required to maintain the voltage of armature 13a at any given value, the power factor measuring circuit described above operates to produce across the noncommon terminals of resistors 27, 29 a reversible unidirectional control voltage having a polarity and magnitude dependent upon the direction and magnitude of variations in the power factor of conductors 6, 7, 8 from a predetermined value. This control voltage is impressed on field winding 13c to change the excitation of field winding 11b in a direction to return the power factor of the circuit to the desired value.

Network 32 is so designed that when the voltage of conductors 6, 7, 8 is above a critical minimum value, transformer 33 saturates over the greater part of each cycle. That is, network 32 resonates during some part of each cycle at the critical minimum value of the circuit voltage and resonates during a different part of each cycle at the normal value of the circuit voltage, so that at normal circuit voltage the average voltage of capacitor 34 exceeds the average voltage of winding 33b. Therefore, the voltage of rectifier 41 and resistor 42 exceeds the voltage of rectifier 38 and resistor 39 to impress across control winding 44b a control voltage of a predetermined polarity. However, the poling of rectifiers 47, 48 is so chosen that the magnetomotive force produced by this control voltage does not increase the output current through reactance winding 44c, so that this output current has a negligible value. This results in a negligible output voltage being impressed across resistor 49 from rectifier 46, so that the voltage responsive means has a negligible effect upon the regulating system under these conditions.

If the voltage of conductors 6, 7, 8 decreases without an accompanying change in the excitation of machine 11, machine 11 operates overexcited in comparison to the way it operated before the armature voltage decreased. Under this condition, the power factor regulator will tend to reduce the machine excitation to correct the overexcited condition. If the power factor regulator decreases the machine excitation to too great an extent, the machine may lose synchronous stability and pull out of step. To prevent such action, the voltage responsive network produces a signal tending to increase the machine excitation.

When the circuit voltage decreases to a critical minimum value, the voltage of secondary winding 33b exceeds the voltage of capacitor 34. This action reverses the polarity of the control voltage appearing across the noncommon terminals of resistors 39, 42 and across control winding 44b. This control voltage is then of the polarity to increase the output current of amplifier 44, thereby producing a substantial voltage across resistor 49. The action of control winding 44b is increased by the self-saturating action of windings 44c, so that a small control voltage impressed across control winding 44b produces a substantial output voltage across resistor 49. This output voltage is of a polarity to increase the excitation of machine 11 and overcomes the control voltage appearing across resistors 27, 29 to increase the machine excitation.

Thus, the power factor regulator is prevented from decreasing the machine excitation below the stability limit. The voltage change across network 32 which is required to produce resonance is very small, so that the critical minimum value of voltage of the circuit may be accurately controlled. The voltage of conductors 6, 7, 8 at which network 32 resonates, and hence the critical minimum voltage at which the undervoltage protection system operates, may be adjusted by adjustment of autotransformer 37.

Fig. 2 partially illustrates an alternate embodiment of the invention in which amplifier 44 and resistor 39 are eliminated. Rectifiers 38, 41 have one pair of direct current terminals of like polarity connected together and have the other direct current terminals connected directly to resistor 49. Resistor 42 is connected across the direct current terminals of rectifier 41, as in Fig. 1.

When the voltage of capacitor 34 and rectifier 41 exceeds the voltage of winding 33b and rectifier 38, no current flows through resistor 49 from rectifier 41, since rectifier 38 blocks such flow. However, when the voltage of winding 33b and rectifier 38 exceeds the voltage of capacitor 34 and rectifier 41, current flows from rectifier 38 through resistors 42 and 49 back to rectifier 38 to produce across resistor 49 a voltage tending to increase the excitation of machine 11. Thus, the embodiment of Fig. 2 operates in a manner similar to that of Fig. 1 to overcome the action of the power factor regulator when the voltage of conductors 6, 7, 8 decreases to a critical minimum value to increase the excitation of machine 11.

Although but two embodiments of the present invention have been illustrated and described, it will be apparent to those skilled in the art that various changes and modifications may be made therein without departing from the spirit of the invention or from the scope of the appended claims. Features of the nonlinear resonant network disclosed herein are claimed in the application of Daniel J. Sikorra, Serial No. 114,751, filed September 9, 1949.

It is claimed and desired to secure by Letters Patent:

1. In a system for maintaining an operating condition of an alternating current circuit substantially constant at a predetermined value, the combination of a pair of resistors, means responsive to variations in said condition from said predetermined value connected to said resistors for producing in said resistors opposing voltages dependent upon said operating condition so as to produce across said pair of resistors a first reversible control voltage equal to the difference of said opposing voltages, said voltages being equal only when said operating condition has said predetermined value, whereby said first control voltage has one polarity when said variations are in one direction and the opposite polarity when said variations are in the opposite direction, a nonlinear resonant network energized by a measure of the voltage of said circuit, said nonlinear network comprising a magnetically saturable device having a winding connected in series with a capacitor for producing across said capacitor a voltage which varies abruptly at a critical value of the voltage of said circuit, means including rectifier means connected to said network for producing a first voltage proportional to the voltage of said winding and a second voltage proportional to the voltage of said capacitor, means for opposing said first and second voltages to produce a second control voltage dependent upon the difference of said first and second voltages, means for suppressing the difference of said first and second voltages when said second voltage exceeds said first voltage, and means responsive to said first and second control voltages for controlling said condition.

2. In a system for maintaining an operating condition of an alternating current circuit substantially constant at a predetermined value, the combination of a pair of resistors, means responsive to variations in said condition from said predetermined value connected to said resistors for producing in said resistors opposing voltages dependent upon said operating condition so as to produce across said pair of resistors a first reversible control voltage equal to the difference of said opposing voltages, said voltages being equal only when said operating condition has said predetermined value whereby said first control voltage has one polarity when said variations are in one direction and the opposite polarity when said variations are in the opposite direction, a nonlinear resonant network energized by a measure of the voltage of said circuit, said nonlinear network comprising a magnetically saturable device having a winding connected in series with a capacitor for producing across said capacitor a voltage which varies abruptly at a critical value of the voltage of said circuit, means including rectifier means connected to said network for producing a first voltage proportional to the voltage of said winding and a second voltage proportional to the voltage of said capacitor, means for opposing said first and second voltages, means including magnetic amplifier means for producing a second control voltage dependent upon the difference of said first and second voltages, said magnetic amplifier means having a control winding energized by the difference of said first and second voltages and an inductive winding connected to said circuit, means for suppressing the difference of said first and second voltages when said second voltage exceeds said first voltage, and means connected to said resistors and to said inductive winding so as to be responsive to said first and second control voltages for controlling said condition.

3. In a system for controlling an alternating current dynamoelectric machine connected to a load circuit, the combination of a pair of resistors, transformer means connected to said circuit for producing a pair of signal voltages dependent upon variations in the power factor of said machine, rectifier means connected to said transformer means and to said pair of resistors for producing in said resistors opposing voltages dependent upon said signal voltages to produce a first reversible unidirectional control voltage equal to the difference of said opposing voltages, said opposing voltages being equal only when said power factor has a predetermined value whereby said first control voltage has one polarity when said variations are in one direction and the opposite polarity when said variations are in the opposite direction, control means responsive to said first control voltage for controlling the excitation of said machine to maintain the power factor of said machine substantially constant, a nonlinear resonant network energized by a measure of the voltage of said circuit, said nonlinear network comprising a magnetically saturable device having a winding connected in series with a capacitor for producing across said capacitor a voltage which varies abruptly at a critical value of the voltage of said circuit, means including rectifier means connected to said network for producing a first voltage proportional to the voltage of said winding and a second voltage proportional to the voltage of said capacitor, means for opposing said first and second voltages to produce a second control voltage dependent upon the difference of said first and second voltages, means for suppressing the difference of said first and second voltages when said second voltage exceeds said first voltage, and means for impressing said second control voltage on said control means to overcome said first control voltage when said circuit voltage drops to said critical value for increasing the excitation of said machine.

4. In a system for controlling an alternating current dynamoelectric machine connected to a load circuit, the combination of a pair of resistors, means connected to said circuit and to said pair of resistors for producing in said resistors opposing voltages dependent upon variations in the power factor of said machine to produce across said pair of resistors a first reversible unidirectional control voltage equal to the difference of said opposing voltages, said voltages being equal only when said power factor has a predetermined value whereby said first control voltage has one polarity when said variations are in one direction and the opposite polarity when said variations are in the opposite direction, control means responsive to said first control voltage for controlling the excitation of said machine to maintain the power factor of said machine substantially constant, a nonlinear resonant network energized by a measure of the voltage of said circuit, said network comprising a magnetically saturable device having a winding connected in series with a capacitor for producing across said capacitor a voltage which varies abruptly at a critical value of the voltage of said circuit, means including rectifier means connected to said capacitor and to said winding for producing a first voltage proportional to the voltage of said winding and a second voltage proportional to the voltage of said capacitor, means for opposing said first and second voltages to produce a second control voltage dependent upon the difference of said first and second voltages, means for suppressing the difference of said first and second voltages when said second voltage exceeds said first voltage, means for impressing on said control means said second control voltage to cause said second control voltage to overcome said first control voltage to increase the excitation of said machine when the voltage of said circuit drops to said critical value.

5. In a system for controlling an alternating current dynamoelectric machine connected to a load circuit, the combination of a pair of resistors, means connected to said circuit and to said pair of resistors for producing in said resistors opposing voltages dependent upon the power factor of said machine to produce across said pair of resistors a first reversible unidirectional control voltage equal to the difference of said opposing voltages, said voltages being equal only when said power factor has a predetermined value whereby said first control voltage has one polarity when said variations are in one direction and the opposite polarity when said variations are in the opposite direction, control means responsive to said first control voltage for controlling the excitation of said machine to maintain the power factor of said machine substantially constant, a nonlinear resonant network energized by a measure of the voltage of said circuit, said network comprising a magnetically saturable device having a winding connected in series with a capacitor for producing across said capacitor a voltage which varies abruptly at a critical value of the voltage of said circuit, said critical value being a predetermined amount below the normal voltage of said circuit, means including rectifier means connected to said capacitor and to said winding for producing a first voltage proportional to the voltage of said winding and a second voltage proportional to the voltage of said capacitor, means for opposing said first and second voltages, means including magnetic amplifier means for producing a second control voltage dependent upon the difference of said first and second voltages, said magnetic amplifier means having a control winding energized by the difference of said first and second voltages and an inductive winding connected to said circuit, means for suppressing the difference of said first and second voltages when said second voltage exceeds said first voltage, and means for connecting said control means to said inductive winding for impressing said second control voltage on said control means to cause said output voltage to overcome said first control voltage to increase the excitation of said machine when the voltage of said circuit drops to said critical value.

DALE V. HOTSON.

References Cited in the file of this patent

UNITED STATES PATENTS

| Number | Name | Date |
|---|---|---|
| 2,396,851 | Hysler | Mar. 19, 1946 |
| 2,478,623 | Crary et al. | Aug. 9, 1949 |
| 2,558,572 | Logan | June 26, 1951 |
| 2,576,646 | Sikorra | Nov. 27, 1951 |
| 2,576,647 | Sikorra | Nov. 27, 1951 |